United States Patent
Ito

(10) Patent No.: US 7,586,535 B2
(45) Date of Patent: Sep. 8, 2009

(54) CAMERA HAVING A DETECTION CIRCUIT FOR DETECTING OPERATIONAL INTERVAL T BETWEEN THE HALF-PRESS OPERATION AND FULL-PRESS OPERATION

(75) Inventor: Makoto Ito, Saitama (JP)

(73) Assignee: Eastman Kodak Company, Rochester, NY (US)

( * ) Notice: Subject to any disclaimer, the term of this patent is extended or adjusted under 35 U.S.C. 154(b) by 519 days.

(21) Appl. No.: 11/311,192

(22) Filed: Dec. 19, 2005

(65) Prior Publication Data

US 2006/0268147 A1    Nov. 30, 2006

(30) Foreign Application Priority Data

May 31, 2005    (JP)    ............................. 2005-158243

(51) Int. Cl.
*H04N 5/232*    (2006.01)
*G03B 13/00*    (2006.01)

(52) U.S. Cl. .................. 348/347; 348/349; 348/351
(58) Field of Classification Search .............. 348/353, 348/364, 345–347, 349, 351
See application file for complete search history.

(56) References Cited

U.S. PATENT DOCUMENTS

| | | | | |
|---|---|---|---|---|
| 6,549,729 | B1 * | 4/2003 | Robins et al. ................ | 396/103 |
| 7,280,147 | B2 * | 10/2007 | Kitajima et al. .............. | 348/345 |
| 7,301,579 | B2 * | 11/2007 | Shinohara et al. ............ | 348/345 |
| 7,319,488 | B2 * | 1/2008 | Sagiya ......................... | 348/362 |
| 7,397,510 | B2 * | 7/2008 | Yasuda ......................... | 348/356 |
| 2003/0063322 | A1 * | 4/2003 | Itoh et al. .................... | 358/302 |
| 2004/0022531 | A1 * | 2/2004 | Schinner ...................... | 396/67 |
| 2004/0174451 | A1 * | 9/2004 | Okazaki et al. ......... | 348/333.02 |
| 2004/0240871 | A1 * | 12/2004 | Shinohara .................... | 396/104 |
| 2004/0263633 | A1 * | 12/2004 | Shinohara et al. ....... | 348/207.99 |
| 2005/0012846 | A1 * | 1/2005 | Shinohara .................... | 348/345 |
| 2005/0041136 | A1 * | 2/2005 | Miyata et al. ................ | 348/345 |

FOREIGN PATENT DOCUMENTS

| | | |
|---|---|---|
| JP | 2003-189160 | 7/2003 |
| JP | 2003-255428 | 9/2003 |
| JP | 2005189532 A * | 7/2005 |

* cited by examiner

*Primary Examiner*—Ngoc-Yen T Vu
(74) *Attorney, Agent, or Firm*—Pamela R. Crocker; Peyton C. Watkins

(57) ABSTRACT

The present invention relates to an image capturing device for applying auto-focus processing triggered in response to an operation of half-pressing a shutter button, and initiating image capturing triggered in response to an operation of full-pressing the shutter button. In the image capturing device, an image capturing mode control section detects an operational interval T between the half-pressing operation to the full-pressing operation, and, when the operational interval is longer than a predetermined threshold interval $T_0$, selects a focus priority mode in which auto-focus processing is continued and image capturing is initiated after completion of the auto-focus processing, and, when the operational interval T is shorter than the threshold interval $T_0$, selects a shutter chance priority mode in which the auto-focus processing is stopped and image capturing is instantly initiated.

5 Claims, 10 Drawing Sheets

| ZOOM POSITION | FOCAL DISTANCE |
|---|---|
| 6 | a[mm] |
| 5 | 2a[mm] |
| 4 | 3a[mm] |
| 3 | 4a[mm] |
| 2 | 5a[mm] |
| 1 | 6a[mm] |

| ZOOM POSITION | 6 | 5 | 4 | 3 | 2 | 1 |
|---|---|---|---|---|---|---|
| FOCAL DISTANCE | a[mm] | 2a[mm] | 3a[mm] | 4a[mm] | 5a[mm] | 6a[mm] |
| F22 | O | O | O | | | |
| F16 | O | O | O | | | |
| F11 | O | O | | | | |
| F8.0 | O | | | | | |
| F5.6 | | | | | | |
| F4.0 | | | | | | |
| F2.8 | | | | | | |
| F2.0 | | | | | | |
| F1.4 | | | | | | |

APERTURE VALUE

Fig. 6

ACCEPTABLE CONDITION WITHOUT FLASH

| ZOOM POSITION | 6 | 5 | 4 | 3 | 2 | 1 |
|---|---|---|---|---|---|---|
| FOCAL DISTANCE / APERTURE VALUE | a[mm] | 2a[mm] | 3a[mm] | 4a[mm] | 5a[mm] | 6a[mm] |
| F22 | ○ | ○ | ○ | | | |
| F16 | ○ | ○ | ○ | | | |
| F11 | ○ | ○ | | | | |
| F8.0 | ○ | | | | | |
| F5.6 | | | | | | |
| F4.0 | | | | | | |
| F2.8 | | | | | | |
| F2.0 | | | | | | |
| F1.4 | | | | | | |

ACCEPTABLE CONDITION WITH FLASH

| ZOOM POSITION | 6 | 5 | 4 | 3 | 2 | 1 |
|---|---|---|---|---|---|---|
| FOCAL DISTANCE | a[mm] | 2a[mm] | 3a[mm] | 4a[mm] | 5a[mm] | 6a[mm] |
| APERTURE VALUE F22 | O | O | O | | | |
| F16 | O | O | | | | |
| F11 | O | | | | | |
| F8.0 | | | | | | |
| F5.6 | | | | | | |
| F4.0 | | | | | | |
| F2.8 | | | | | | |
| F2.0 | | | | | | |
| F1.4 | | | | | | |

.# CAMERA HAVING A DETECTION CIRCUIT FOR DETECTING OPERATIONAL INTERVAL T BETWEEN THE HALF-PRESS OPERATION AND FULL-PRESS OPERATION

FIELD OF THE INVENTION

The present invention relates to an image capturing method for an image capturing device.

BACKGROUND OF THE INVENTION

As described in Japanese Patent Application Laid-Open No. 2003-189160, and Japanese Patent Application Laid-Open No. 2003-255428, a camera is often designed in such a manner as to perform auto exposure (AE) and auto focus (AF) when a shutter button is half pressed, and to perform image capturing when the shutter button is fully pressed.

However, a certain time is required in auto-focusing, because photometry and ranging are performed, and a lens is driven so as to focus a subject. As a result, even when a user fully presses the shutter button, the image capturing is not initiated until predetermined initialization such as the auto-focusing that is required for the image capturing is completed, and the image capturing cannot be performed at a user's intended timing in some case.

SUMMARY OF THE INVENTION

An object of the present invention is to reduce a time lag from a user's intended image capture timing.

According to the present invention, there is provided an image capturing device in which auto-focus process is initiated by half-pressing of a shutter button, and image capturing process is initiated by full-pressing of a shutter button, comprising: a detection circuit for detecting an operational interval between the half-press operation and the full press operation; and a control circuit for continuing auto-focus processing to initiate image capturing after completion of the auto-focus processing when the operational interval is longer than a predetermined threshold interval, and stopping the auto-focus processing to instantly initiate image capturing when the operational interval is shorter than the threshold interval.

According to the present invention, when the operational interval is shorter than the threshold interval, it is judged that a user fully presses the shutter button in a single step and gives priority to a potential photo opportunity rather than to auto-focus. The auto-focus is stopped to perform the image capturing. Consequently, it is possible to reduce a time lag from a user's intended image capturing timing.

According to one mode of the image capturing device of the present invention, the image capturing device comprises a parameter acquiring circuit for acquiring an image capturing parameter. The control circuit continues the auto-focus processing, and initiates the image capturing after the completion of the auto-focus processing, when the image capturing parameter fails to satisfy a predetermined conditions for capturing acceptable image even in a case where the operational interval is shorter than the threshold interval.

Here, the image capturing parameter is, for example, a focal distance, or a combination of the focal distance and an aperture value. As described above, even in a case where the operational interval is shorter than the threshold interval, when the image capturing parameter fails to satisfy the predetermined image capturing acceptable condition, the auto-focus processing is continued, and the image capturing is initiated after the completion of the auto-focus processing. This can reduce a possibility of out-of-focus imaging due to suspended auto-focus processing. The image capturing acceptable condition is, for example, a condition for defining an acceptable range of the image capturing parameter which satisfies a desirable depth of field.

Moreover, different image capturing acceptable conditions may be prepared for image capturing using a flash and using no flash. By use of the different image capturing acceptable conditions for the image capturing using the flash and using no flash, the possibility of out-of-focus imaging can be further reduced.

In addition, according to one aspect of the image capturing device of the present invention, the image capturing device moves a focus lens to a specific position to perform the image capturing in a case where the auto-focus processing is stopped.

Here, the specific position indicates, for example, a position to which the focus lens is moved in such a manner that the focal distance is obtained depending on a fixed subject distance that is a predetermined fixed distance between the image capturing device and a subject.

BRIEF DESCRIPTION OF THE DRAWINGS

FIG. 6 is a diagram showing one example of an acceptable condition to be referred to by the image capturing mode control section in Embodiment 2;

FIG. 8A is a diagram showing one example of the acceptable conditions without emission of flash light, to which the image capturing mode control section refers in Embodiment 3;

FIG. 8B is a diagram showing one example of the acceptable conditions with emission of flash light, to which the image capturing mode control section refers in Embodiment 3;

DETAILED DESCRIPTION OF THE INVENTION

A first embodiment (hereinafter referred to as Embodiment 1) will be described hereinafter as the best mode for carrying out the present invention with reference to the accompanying drawings.

Figure 1:
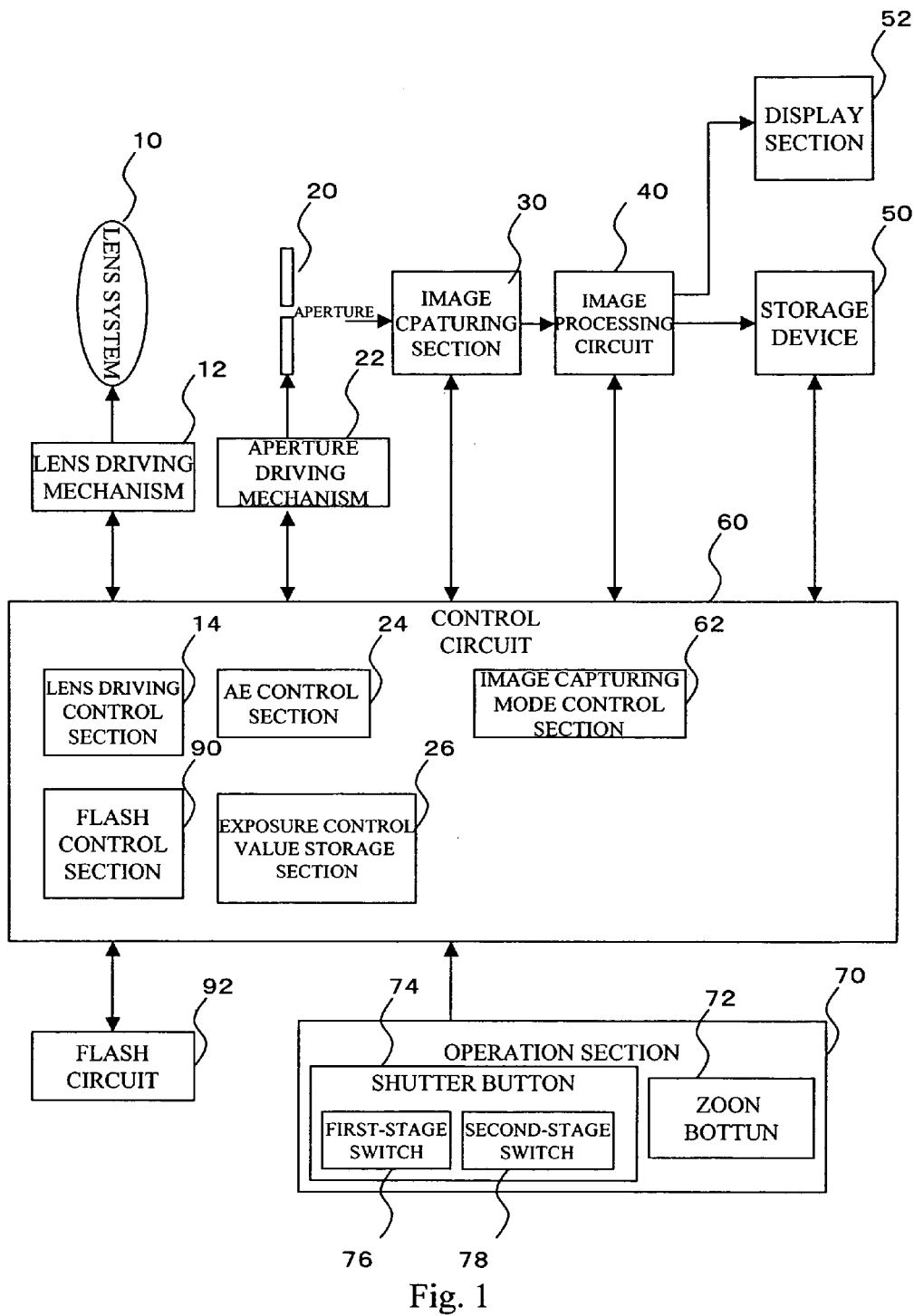
FIG. 1 is a diagram showing functional blocks of an image capturing device according to Embodiment 1.

FIG. 1 shows functional blocks of an image capturing device according to Embodiment 1. In FIG. 1, a lens system 10 is constituted of various types of lenses such as a focus lens and a zoom lens. A quantity of light that passes from a subject through the lens system 10 is adjusted by an aperture 20, and the light enters an image capturing section 30. The image capturing section 30 photoelectrically converts incident light into a signal charge by means of a light receiving element array, and outputs the signal charge. The light receiving element array of the image capturing section 30 is constituted of longitudinal M×lateral N (M, N are integers) pixels to which color filters of red (R), green (G), and blue (B) have been attached. A video signal output from the image capturing section 30 constitutes the video signal having RGB components.

The image capturing section 30 has as output modes of the video signal a draft mode, in which a simple video signal for live viewing is output including some pixels obtained by thinning a longitudinal image into 1/m (m is an integer), and a frame mode in which a video signal for recording is output including all the pixels.

An image processing circuit 40 subjects the video signal to various types of image processing such as A/D conversion or gamma correction. A storage device 50 stores the video signal for recording subjected to the predetermined image processing as image data. A display section 52 displays a dynamic image on a screen during live viewing, and displays a static image when previewing. A control circuit 60 is a central processing unit which controls the whole image capturing device.

A lens driving mechanism 12 drives various types of lenses constituting the lens system 10 based on a driving instruction in response to zoom processing or auto-focus processing from a lens driving control section 14.

Figures 3, 4:
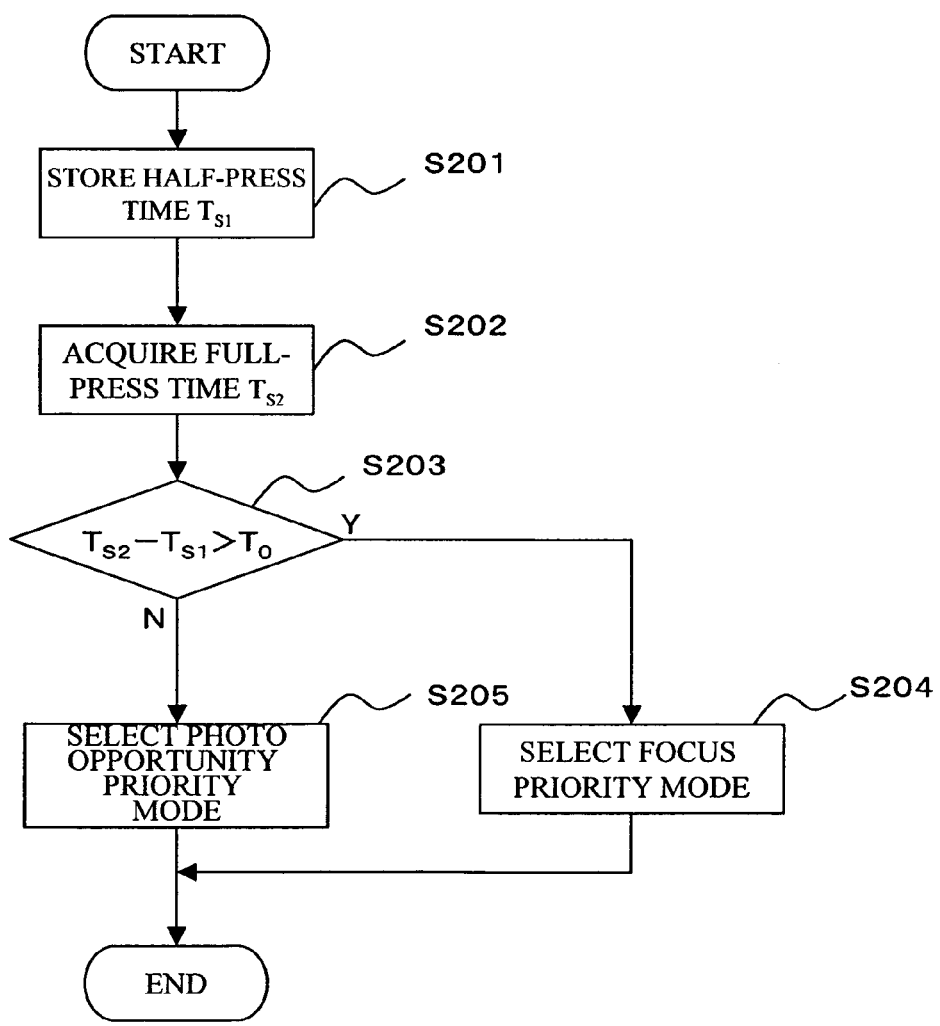
FIG. 3 is a diagram showing a relation between a zoom position and a focal distance, which is set to the image capturing device according to each embodiment.
FIG. 4 is a flowchart showing a mode selection processing procedure performed by an image capturing mode control section according to Embodiment 1.

In a case where the zoom processing is performed, the lens driving control section 14 outputs the driving instruction to the lens driving mechanism 12 in such a manner as to bring the lens system 10 into a predetermined zoom position based on a zoom-up instruction or a zoom-down instruction from the control circuit 60. In Embodiment 1, as shown in FIG. 3, first to sixth-stage zoom positions are defined, and focal distances are defined depending on the respective zoom positions. That is, the lens driving control section 14 drives the lens system 10 via the lens driving mechanism 12 to thereby adjust the lens system 10 into the focal distance depending on the indicated zoom position.

Moreover, in a case where the auto-focus processing is performed, the lens driving control section 14 changes a contrast of the video signal output from the image capturing section 30 while gradually moving the lens system 10 via the lens driving mechanism 12. The section accordingly determines a lens position where this contrast reaches peak, and sets a focused position. It is to be noted that in Embodiment 1, a so-called contrast detection system is used as the auto-focus processing, but the auto-focus processing may be performed using another system such as a so-called active system in which an infrared ray is projected on a subject, the infrared ray reflected from the subject is received by a light receiving element such as a position sensitive detector (PSD), and a distance to the subject is measured according to a triangular ranging principle.

An aperture driving mechanism 22 adjusts an opening diameter of the aperture 20 in such a manner as to obtain adequate exposure under control of an AE control section 24. The AE control section 24 calculates a photometric value of the subject by use of the video signals successively output from the image capturing section 30, and calculates such an aperture value and exposure period as to obtain the adequate exposure based on the photometric value. The aperture value and the exposure period are successively stored as exposure control values in an exposure control value storage section 26. Furthermore, the AE control section 24 reads the latest exposure control value from the exposure control value storage section 26, adjusts the opening diameter of the aperture 20 via the aperture driving mechanism 22, and adjusts the exposure period of the image capturing section 30, that is, a shutter speed. Based on the calculated photometric value, the AE control section 24 judges whether or not flash light needs to be emitted at an image capturing time, and outputs an instruction for the emission of the flash light to a flash control section 90 when the flash light needs to be emitted. The flash control section 90 controls a flash circuit 92 to emit the flash light based on flash information supplied from the AE control section 24.

An operation section 70 is a user interface at a time when a user operates the image capturing device, and includes a zoom button 72 and a shutter button 74. The zoom button 72 is operation means for the user to adjust a field angle. When the user operates the zoom button 72, the zoom-up instruction or the zoom-down instruction is output to the lens driving control section 14, and the lens driving control section 14 drives the lens system 10 via the lens driving mechanism 12 in response to the instruction. The shutter button 74 is operation means for the user to instruct the image capturing, and is constituted of two stages of switches. When the user "half presses" the shutter button 74, a first-stage switch 76 turns "ON". When the user "fully presses" the shutter button, a second-stage switch 78 turns "ON". When the first-stage switch 76 turns on, exposure control and auto-focusing are performed. When the second-stage switch 78 turns on, the image capturing is performed.

Next, an operation will be described in a case where the image capturing device according to Embodiment 1 performs the image capturing by the auto-focusing with reference to a flowchart shown in FIG. 2.

When the image capturing device is set to an image capturing mode, the image capturing section 30 is brought into a draft mode to output a simple video signal for live viewing (S101), and a live viewing image is displayed on the display section 52 based on the simple video signal (S102).

Here, when the shutter button 74 is half pressed (judgment result of S103 is affirmative "Y"), the AE control section 24 exposure-controls the opening diameter of the aperture 20 via the aperture driving mechanism 22 in such a manner as to obtain the adequate exposure based on the aperture value acquired from the exposure control value storage section 26 (S104). Furthermore, the AE control section 24 performs an auto-focus control (S105). That is, the AE control section 24 changes the contrast of the video signal output from the image capturing section 30 while gradually moving the lens system 10 via the lens driving mechanism 12. The section accordingly determines the lens position where this contrast reaches peak, and sets the focused position.

When the shutter button 74 is fully pressed after completion of the auto-focus control (judgment result of S106 is affirmative "Y"), the image capturing section 30 switches to the frame mode (S107). Moreover, the image processing circuit 40 acquires the video signal for recording output from the image capturing section 30 (S108), subjects the signal to the predetermined image processing, and stores the video signals for one frame as image data in the storage device 50 (S109).

Figure 2:
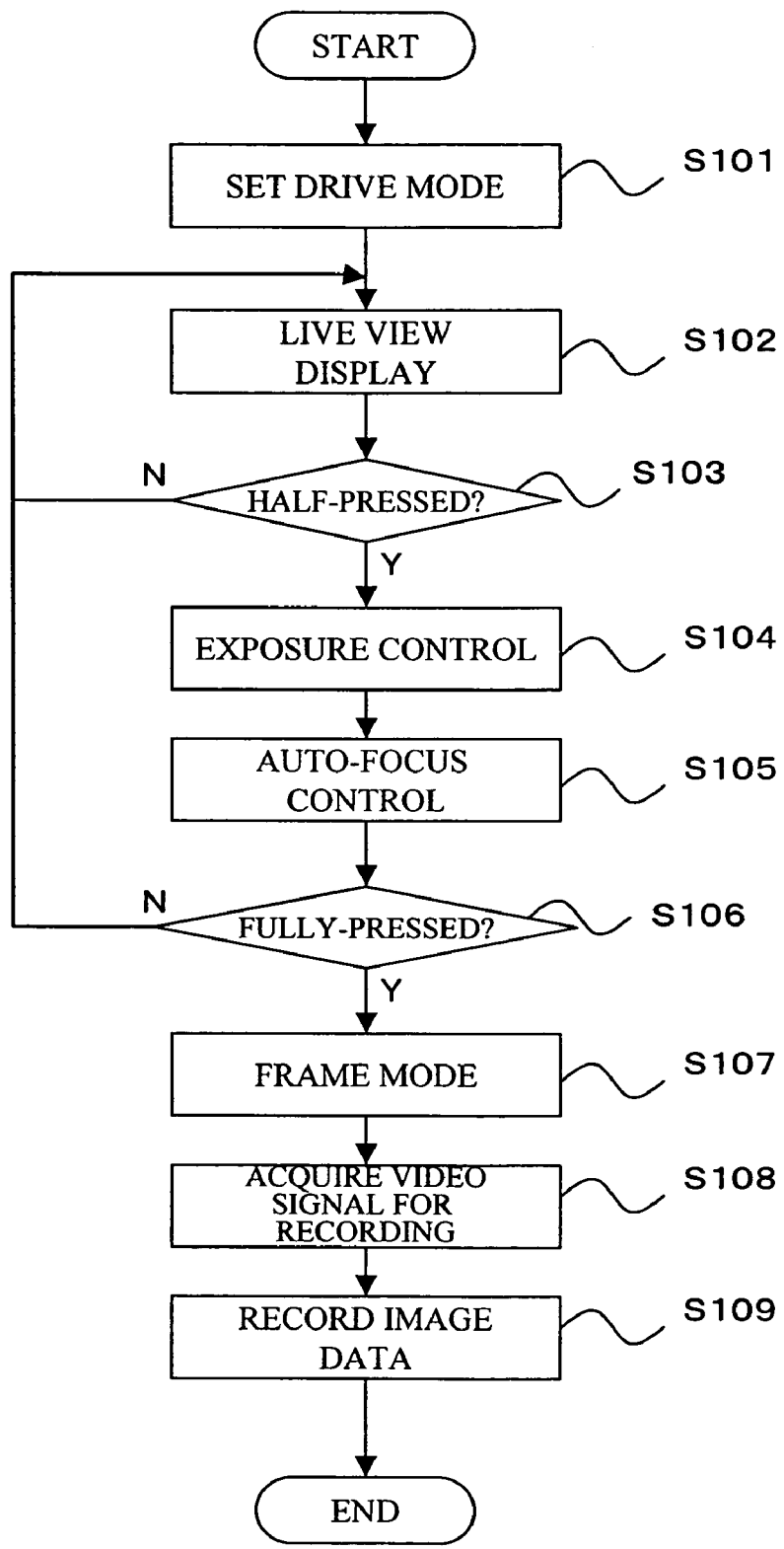
FIG. 2 is a flowchart showing an operation in a case where the image capturing device of each embodiment performs auto-focus at an image capturing time.

In FIG. 2, a certain degree of time is required for processing of S103 to S105 in which the shutter button 74 is half pressed by the user, the lens system 10 is moved to the focused position by the auto-focusing, and the device becomes ready for the image capturing. Therefore, for example, when the user fully presses the shutter button 74 in a single step, an image capturing timing deviates as much as the time required for the auto-focus processing or the like, and the image capturing is not performed within a period of time desired by the user in some case.

To solve the problem, in Embodiment 1, in a case where an operational interval from a time when the shutter button 74 is half pressed until the shutter button 74 is fully pressed is shorter than a predetermined threshold interval (e.g., 0.2 second), it is judged that the shutter button 74 is fully pressed in a single step and that the user gives priority to the photo opportunity rather than to the auto-focus. The auto-focusing is stopped, and the image capturing is instantly performed. On the other hand, when the operational interval is longer than the predetermined threshold interval, it is judged that the auto-focus has priority over the photo opportunity. The auto-focusing is continued to perform the image capturing. The former will be hereinafter referred to as the photo opportunity priority mode, and the latter will be referred to as the focus priority mode.

To realize the above-described modes, the control circuit 60 comprises an image capturing mode control section 62. The image capturing mode control section 62 selects either of the focus priority mode and the photo opportunity priority mode depending on the operational interval between the half-press operation and the full-press operation of the shutter button 74. In the focus priority mode, even in a case where the shutter button 74 is fully pressed, when the auto-focus processing is not completed, the auto-focus processing is continued, and the image capturing is performed after the completion of the auto-focus processing. In the photo opportunity priority mode, even when the auto-focus processing is not completed in a case where the shutter button 74 is fully pressed, the auto-focus processing is stopped, and the image capturing is performed.

When the focus priority mode is selected, the image capturing device drives the lens system 10, and adjusts a focal point depending on a distance (hereinafter referred to as the subject distance) between the image capturing device and the subject.

On the other hand, when the photo opportunity priority mode is selected, the image capturing device fixes the distance between the image capturing device and the subject to a predetermined distance, and drives the lens system 10 to adjust the focal point depending on the fixed subject distance. The fixed subject distance may be set to, for example, 1 m, 3 m, an infinite distance or the like depending on a use situation of the image capturing device. When the lens system 10 is adjusted into the focal point depending on the fixed subject distance after the completion of the zoom processing, driving processing for the adjustment of the focal point of the lens system 10 may be omitted to perform the image capturing in a case where the photo opportunity priority mode is selected.

Next, a processing procedure of the image capturing mode control section 62 will be described with reference to a flowchart shown in FIG. 4.

When the image capturing mode control section 62 detects that the shutter button 74 has been half pressed, a time $T_{S1}$ when the button was half pressed is stored (S201). Furthermore, when it is detected that the shutter button 74 has been fully pressed, a time $T_{S2}$ when the button was fully pressed is acquired (S202). Subsequently, the image capturing mode control section 62 calculates an operational interval T ($=T_{S2}-T_{S1}$) from a time when the shutter button 74 is half pressed until the shutter button 74 is fully pressed from the stored time $T_{S1}$, and the acquired time $T_{S2}$. When the operational interval T is longer than a threshold interval $T_0$ (judgment result of S203 is affirmative "Y"), the focus priority mode is selected. On the other hand, when the operational interval T is shorter than the threshold interval $T_0$ (judgment result of S203 is negative "N"), the photo opportunity priority mode is selected.

The control circuit 60 receives a selection result of the image capturing mode control section 62, and controls each section to perform the image capturing. That is, in a case where the focus priority mode is selected, when the shutter button 74 is fully pressed, but the auto-focus processing is not completed, the control circuit 60 controls each section in such a manner as to continue the auto-focus processing and perform the image capturing after the completion of the auto-focus processing. On the other hand, in a case where the photo opportunity priority mode is selected, even when the auto-focus processing is not completed in a stage in which the shutter button 74 is fully pressed, the control circuit 60 controls each section in such a manner as to stop the auto-focus processing and perform the image capturing.

As described above, according to Embodiment 1, in a case where the operational interval from a time when the shutter button 74 is half pressed until the shutter button 74 is fully pressed is shorter than the predetermined threshold interval, it is judged that the shutter button 74 is fully pressed in a single step and that the user gives priority to the photo opportunity rather than to the auto-focus. The auto-focusing is stopped, and the image capturing is instantly initiated. Therefore, in a case where the user fully presses the shutter button 74 in a single step, the image capturing is not initiated until the auto-focus processing is completed. This can prevent a disadvantage that the image capturing timing deviates and the image capturing cannot be performed within the time required by the user.

Next, a second embodiment (hereinafter referred to as Embodiment 2) of the present invention will be described hereinafter with reference to the drawings.

In Embodiment 1, the example has been described in which a mode forcibly shifts to a photo opportunity priority mode, and auto-focus processing is stopped to initiate image capturing in a case where an operational interval from a time when a shutter button 74 is half pressed until the shutter button 74 is fully pressed is shorter than a predetermined threshold interval. However, when the auto-focus processing is discontinued, the resultant image is remarkably out-of-focus, and a user's desired image cannot be obtained depending on a zoom position, a subject distance or the like of a lens system 10 in some case. To solve the problem, in Embodiment 2, acceptable conditions for shifting to the photo opportunity priority mode are predetermined depending on image capturing parameters obtained before the image capturing. Moreover, even in a case where the operational interval is shorter than the predetermined threshold interval, when the image capturing parameters fail to satisfy the acceptable conditions, the auto-focus processing is continued without shifting to the photo opportunity priority mode. Here, the acceptable conditions are conditions which define an acceptable range of the image capturing parameters which satisfy a desirable depth of field as described later in detail.

Figure 5:
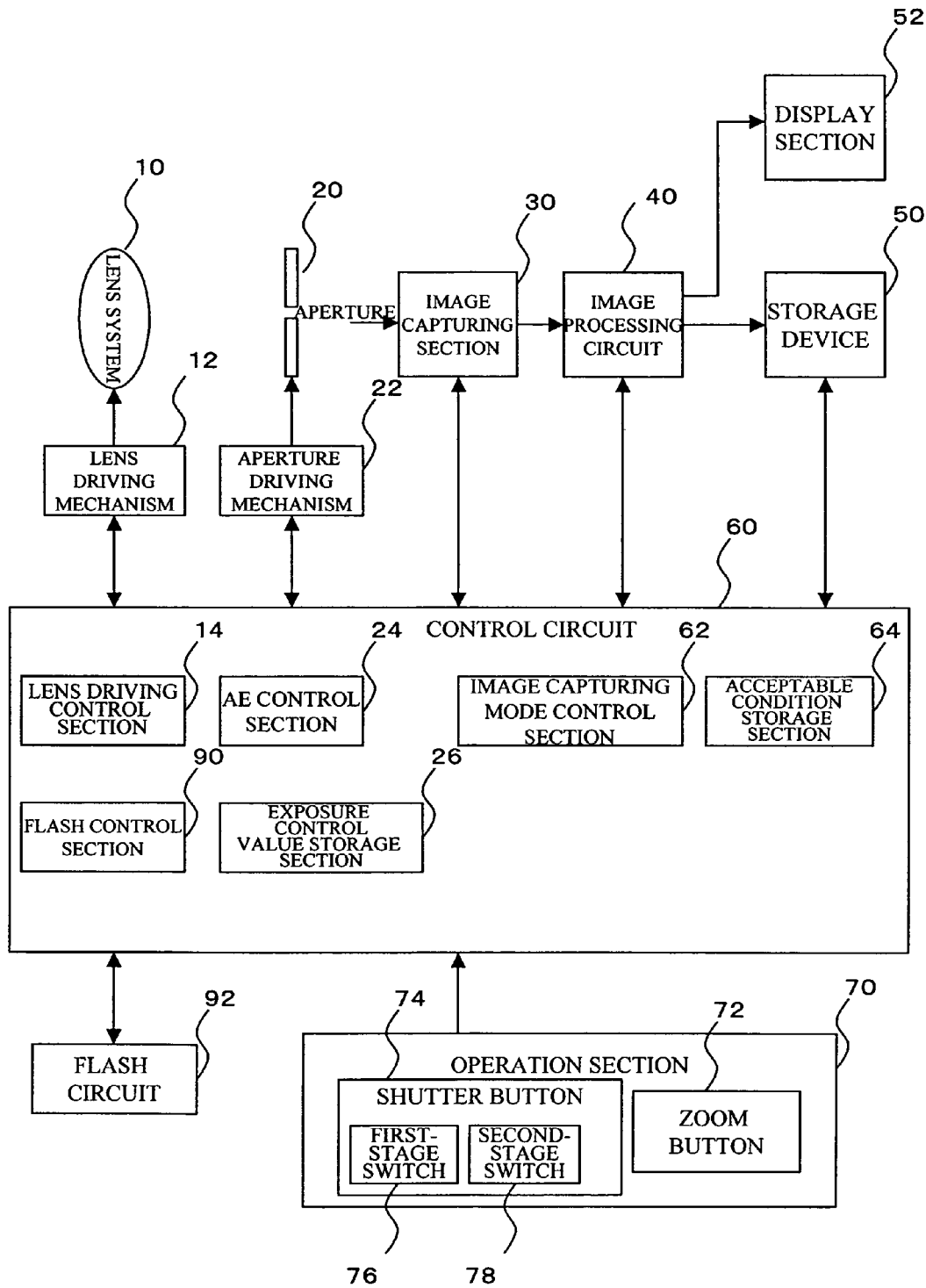
FIG. 5 is a diagram showing functional blocks of the image capturing device according to Embodiments 2 and 3.

FIG. 5 is a diagram showing functional blocks of the image capturing device according to Embodiment 2. In FIG. 5, the same functional blocks as those shown in FIG. 1 are denoted with the same reference numerals. In an acceptable condition storage section 64, the acceptable conditions are stored as a judgment standard for judging whether or not to shift to the photo opportunity priority mode. The image capturing parameters indicated in the acceptable conditions are a zoom position of the lens system 10, and an aperture value of an aperture 20. As to the acceptable conditions, as shown in FIG. 6, it is judged by a combination of the zoom position and the aperture value whether or not to permit the shift to the photo opportunity priority mode. In FIG. 6, the combination of the zoom position and the aperture value, which permits the shift to the photo opportunity priority mode, is shown by a circle mark "○". It is to be noted that settings of the acceptable conditions may be defined according to an image capturing result of the image capturing actually performed by the image capturing device by use of each combination of the zoom position and the aperture value. Basically, when a so-called depth of field increases, there is a high possibility that the image capturing can be performed without out-of-focus imaging. Therefore, when the depth of field is comparatively large, the shifting to the photo opportunity priority mode may be permitted.

Figure 7:
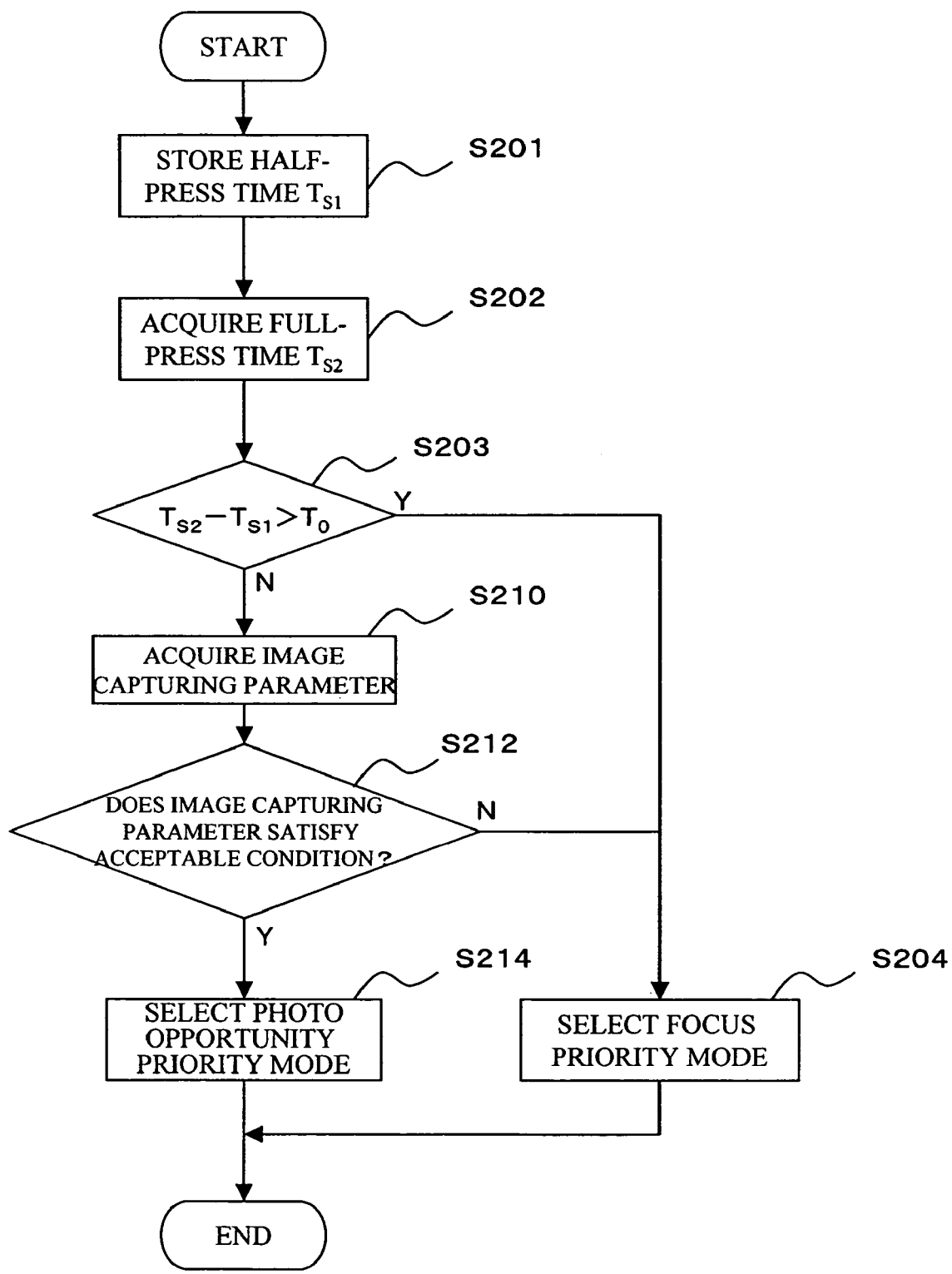
FIG. 7 is a flowchart showing a mode selection processing procedure performed by the image capturing mode control section according to Embodiment 2.

Here, a processing procedure of an image capturing mode control section 62 in Embodiment 2 will be described with reference to a flowchart shown in FIG. 7. It is to be noted that the processing procedure of S201 to S204 are similar to those of the image capturing mode control section 62 of Embodiment 1 shown in FIG. 4, and therefore the description thereof is omitted.

When an operational interval T is shorter than a threshold interval $T_0$ (judgment result of S203 is negative "N"), the image capturing mode control section 62 acquires the zoom position of the lens system 10 and the aperture value of the aperture 20 as the image capturing parameters (S210). It is to be noted that the image capturing mode control section 62 acquires the zoom position from a lens driving control section 14 which controls a lens driving mechanism 12, and acquires the aperture value from an exposure control value storage section 26. Moreover, the image capturing mode control section 62 judges whether or not the acquired combination of the zoom position and the aperture value is a combination to permit the shift to the photo opportunity priority mode with reference to the acceptable conditions stored in the acceptable condition storage section 64, that is, an acceptable condition table shown in FIG. 6.

When the acceptable conditions are satisfied as a result of the judgment (judgment result of S212 is affirmative "Y"), the image capturing mode control section 62 selects the photo opportunity priority mode. On the other hand, when the acceptable conditions are not satisfied (judgment result of S212 is negative "N"), a focus priority mode is selected. Thereafter, the image capturing is performed depending on the selected mode in the same manner as in the image capturing device of Embodiment 1.

As described above, according to Embodiment 2, even in a case where the operational interval T is shorter than the predetermined threshold interval $T_0$, when the image capturing parameters fail to satisfy the predetermined acceptable conditions, the mode does not shift to the photo opportunity priority mode. This can reduce a problem where the out-of-focus imaging due to suspended auto-focus processing occurs and the user's desired image cannot be obtained.

Next, a third embodiment (hereinafter referred to as Embodiment 3) of the present invention will be described hereinafter with reference to the drawings. It is to be noted that functional blocks of an image capturing device according to Embodiment 3 are similar to those of Embodiment 2 as shown in FIG. 5.

In Embodiment 3, flash information indicating whether or not emission of flash light is performed at an image capturing time is newly added as an image capturing parameter, and different acceptable conditions are prepared for image capturing using a flash and using no flash, and registered beforehand in an acceptable condition storage section 64.

The acceptable conditions are defined based on judgment that there is a high possibility that out-of-focus imaging will not occur even if auto-focusing is discontinued. In general, as described above, when a depth of field increases, the possibility that the out-of-focus imaging will not occur increases. Moreover, the depth of field increases when a subject distance increases, and decreases when the subject distance shortens. In a general automatic flash control, in many cases, the flash light is emitted when the subject distance is short.

Therefore, in Embodiment 3, it is judged that the subject distance is short in a case where the flash light is emitted compared with a case where no flash light is emitted, that is, the depth of field is small and the out-of-focus imaging easily occurs in the case where the flash light is emitted compared with the case where no flash light is emitted. The acceptable conditions for shifting to a photo opportunity priority mode are strictly set.

FIG. 8A shows one example of the acceptable conditions in a case where the image capturing is performed without the emission of the flash light, and FIG. 8B shows one example of the acceptable conditions with the emission of the flash light. As shown in FIGS. 8A and 8B, in Embodiment 3, the conditions for shifting to the photo opportunity priority mode are more strictly set in the image capturing with the emission of the flash light compared with the image capturing without the emission of the flash light. That is, even in a case where an operational interval T is shorter than a predetermined threshold interval $T_0$, when the image capturing is performed with the emission of the flash light, auto-focusing is continued, and the image capturing is performed after adjusting a lens system 10 into a focused position depending on a subject distance.

Next, in a processing procedure of an image capturing mode control section 62 in Embodiment 3, aspects different from those of Embodiment 2 will be mainly described with reference to flowcharts shown in FIGS. 9 and 10. It is to be noted that Embodiment 3 is different from Embodiment 2 in that in addition to a zoom position and an aperture value, the image capturing mode control section 62 acquires the flash information as another image capturing parameter from an AE control section 24, and selects the acceptable conditions to be referred to based on the flash information.

Figure 9:
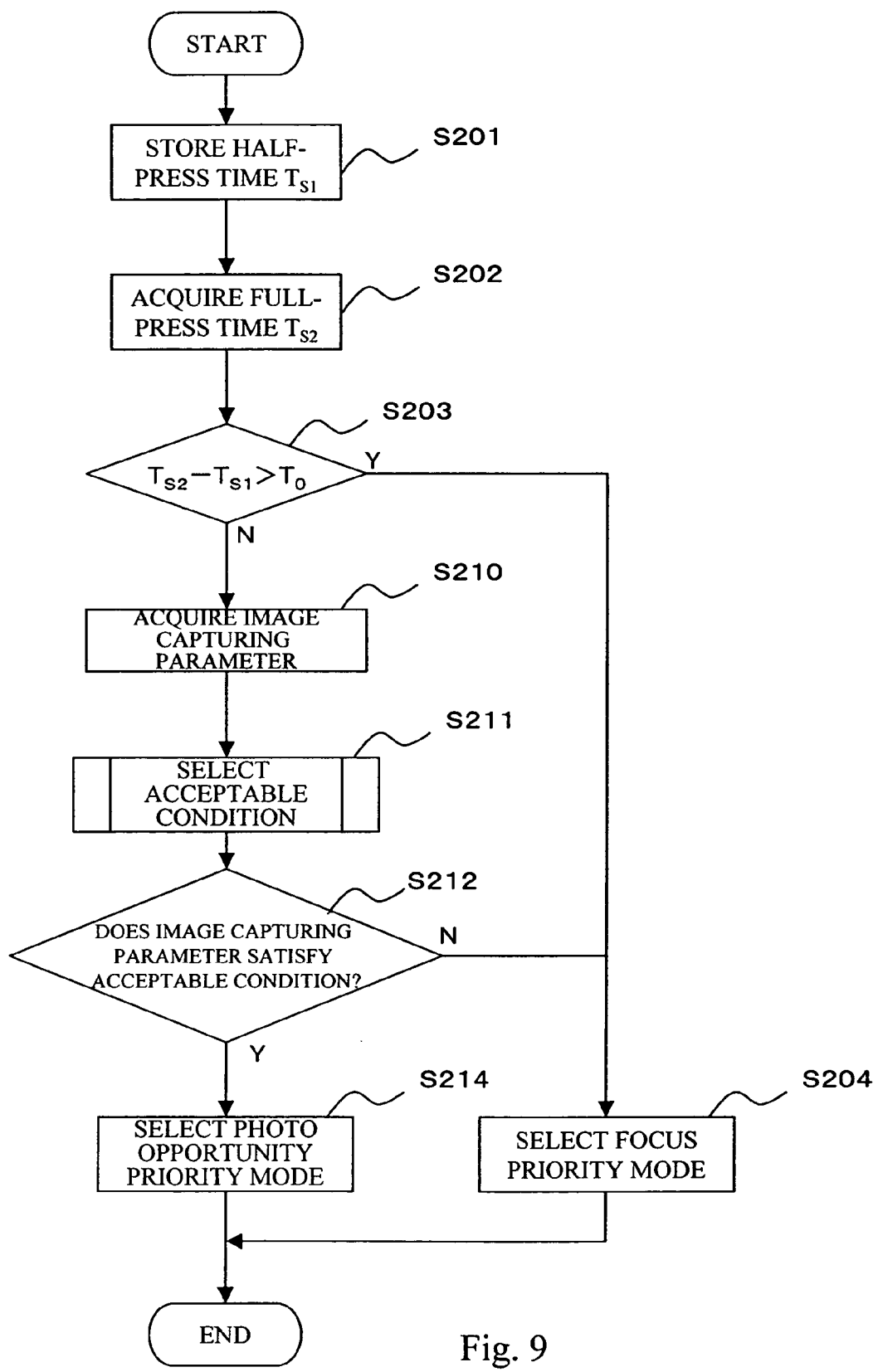
FIG. 9 is a flowchart showing a mode selection processing procedure performed by the image capturing mode control section according to Embodiment 3.
Figure 10:
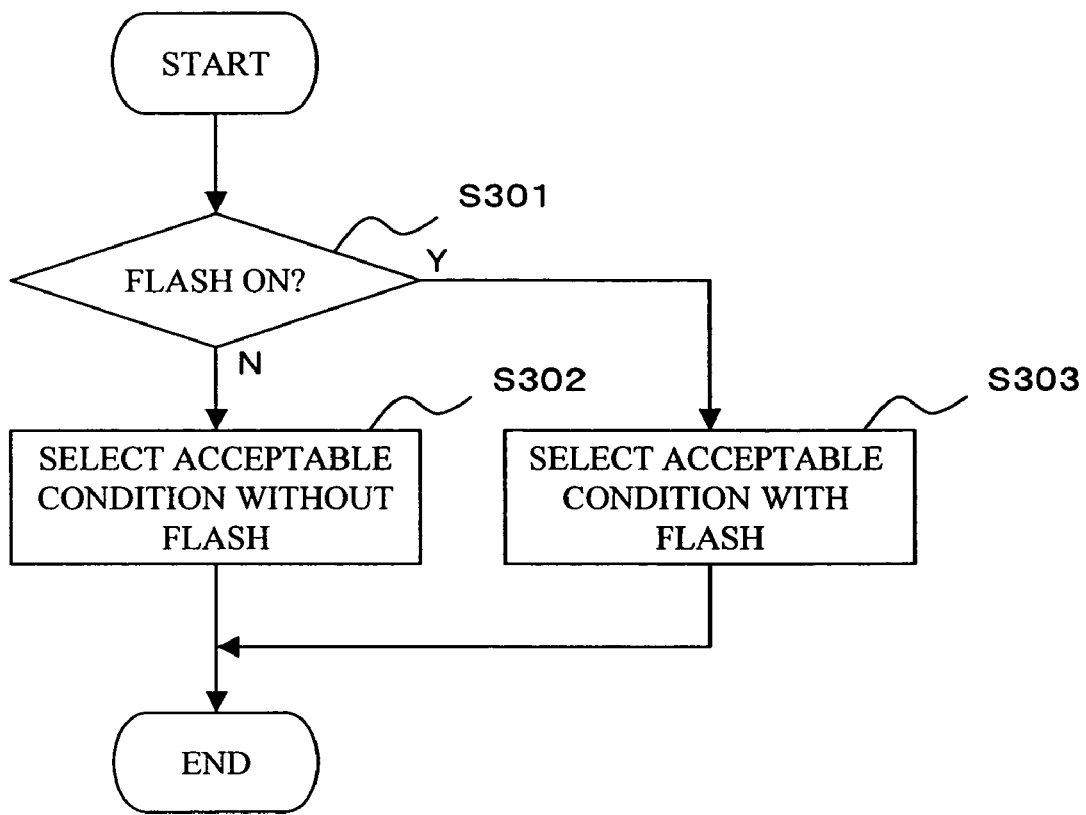
FIG. 10 is a flowchart showing an acceptable condition selection processing procedure performed by the image capturing mode control section according to Embodiment 3.

That is, in FIG. 9, when the operational interval T is shorter than the threshold interval $T_0$ (judgment result of S203 is negative "N"), the image capturing mode control section 62 acquires the zoom position, the aperture value, and the flash information as the image capturing parameters (S210). Moreover, the image capturing mode control section 62 selects an appropriate acceptable condition from an acceptable condition group stored in the acceptable condition storage section 64 based on the flash information (S211). That is, as shown in FIG. 10, in the image capturing without the emission of the flash light (judgment result of S301 is negative "N"), the image capturing mode control section 62 selects the acceptable condition without the emission of the flash light from the acceptable condition group stored in the acceptable condition storage section 64 (S302). On the other hand, in the image capturing with the emission of the flash light (judgment result of S301 is affirmative "Y"), the acceptable condition with the emission of the flash light is selected from the acceptable condition group stored in the acceptable condition storage section 64 (S303).

Thereafter, the image capturing mode control section 62 selects the photo opportunity priority mode or a focus priority mode by judging whether or not an acquired combination of the zoom position and the aperture value satisfies the acceptable condition with reference to the selected acceptable condition in the same manner as in the other embodiments.

As described above, in Embodiment 3, it is generally judged that in a case where the flash light is emitted, the depth of field is smaller, and the out-of-focus imaging more easily occurs compared with when no flash light is emitted. Based on this judgment, in the case where the flash light is emitted, the acceptable conditions for shifting to the photo opportunity priority mode are more strictly defined compared with the case where no flash light is emitted. Accordingly, when the mode shifts to the photo opportunity priority mode, the possibility of the occurrence of the out-of-focus imaging can be reduced.

Moreover, as a modification of Embodiment 3, the fixed subject distance in a case where the image capturing device adjusts the focal point in the photo opportunity priority mode may be changed with and without the emission of the flash light. That is, when the photo opportunity priority mode is selected in the above-described respective embodiments, the lens system 10 is driven to adjust the focal point based on one predetermined fixed subject distance. However, as described above, when the subject distance is shorter, the flash light is emitted. Therefore, the fixed subject distance with the emission of the flash light is set to be shorter than that without the emission of the flash light. For example, the fixed subject distance with the emission of the flash light is set to 1 m, whereas the fixed subject distance without the emission of the flash light is set to the infinite distance. When the fixed subject distance is changed with and without the emission of the flash light, it is possible to reduce the possibility of the out-of-focus imaging during the image capturing in the photo opportunity priority mode.

Furthermore, in the above-described embodiments, when the photo opportunity priority mode is selected, the lens system 10 is driven to adjust the focal point in accordance with the predetermined fixed subject distance. However, when the photo opportunity priority mode is selected, the driving of the lens system 10 is discontinued completely, and the image capturing may be performed while maintaining the positions of various types of lenses at a time when the shutter button 74 is fully pressed. That is, when the photo opportunity priority mode is selected, the image capturing may be performed while keeping the zoom position at a time when the shutter button 74 is fully pressed without considering any subject distance.

In addition, in the above-described embodiments, it is judged based on the combination of the zoom position and the aperture value whether or not to permit the shift to the photo opportunity priority mode. However, the zoom position only may be defined as a judgment condition. In this case, the image capturing mode control section 62 permits the shift to the photo opportunity priority mode, for example, only when the operational interval T is shorter than the threshold interval $T_0$, and the zoom position has the widest angle, that is, the focal distance is shortest. When the shift to the photo opportunity priority mode is permitted only in a case where the focal distance is the shortest, it is possible to further reduce the possibility of the out-of-focus imaging.

What is claimed is:

1. An image capturing device in which auto-focusing process is initiated by half-pressing of a shutter button, and image capturing process is initiated by full-pressing of a shutter button, comprising:
   a detection circuit for detecting an operational interval T between the half-press operation and the full-press operation;
   a parameter acquiring circuit which acquires image capturing parameters;
   a control circuit for continuing the same auto-focus processing and initiating image capturing after completion of the same auto-focus processing when the operational interval is longer than a predetermined threshold interval $T_0$;
   for stopping the same auto-focus processing and initiating instantly image capture when the operational interval is shorter than the threshold interval $T_0$, and when the image capturing parameters satisfy predetermined conditions;
   and for continuing the same auto-focus processing and initiating image capturing after completion of the same auto-focusing processing when the image capturing parameters fall to satisfy predetermined conditions and when the operational interval is shorter than the threshold interval $T_0$.

2. The image capturing device according to claim 1, wherein the image capture parameters include parameters which effect depth of field, and
the predetermined conditions are satisfied when depth of field is greater than a predetermined value.

3. The image capturing device according to claim 2, wherein the image capture parameters include a focal distance.

4. The image capturing device according to claim 2, wherein the image capture parameters include an aperture value.

5. The image capturing device according to claim 2, wherein the image capture parameters include emission of flash light.

* * * * *